Jan. 1, 1929.
E. P. BURKARD
1,697,382
IMAGE PRODUCER
Filed March 6, 1925
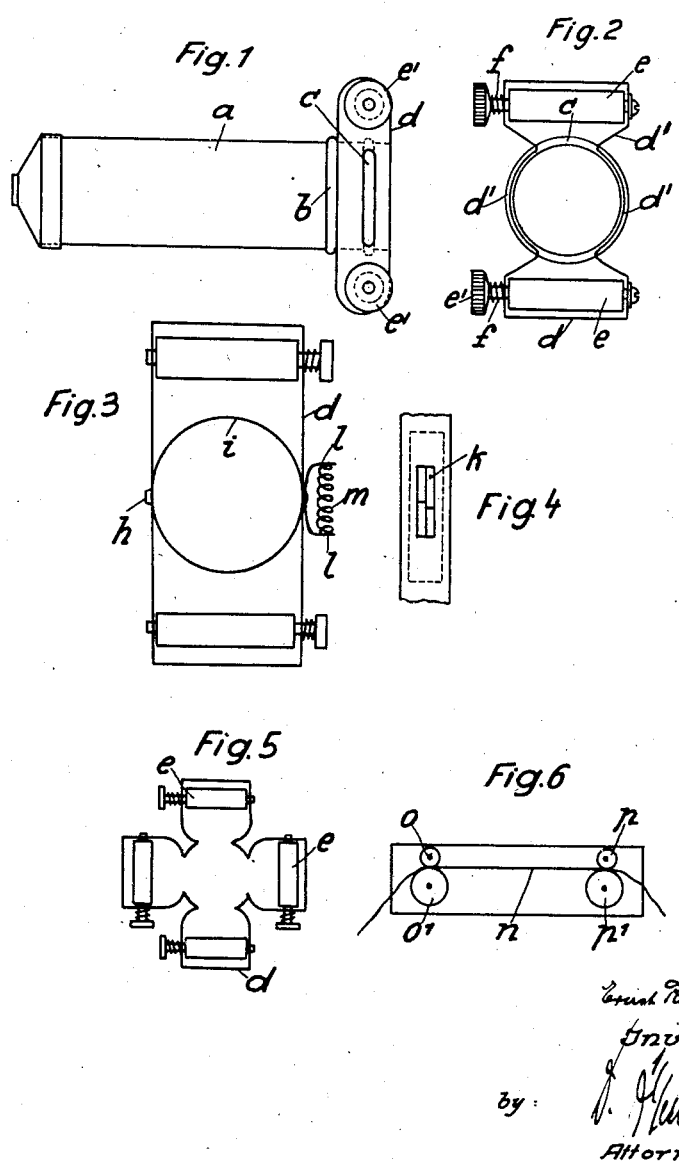

Patented Jan. 1, 1929.

1,697,382

UNITED STATES PATENT OFFICE.

ERNST PAUL BURKARD, OF HAMBURG, GERMANY.

IMAGE PRODUCER.

Application filed March 6, 1925, Serial No 13,548, and in Germany May 21, 1922.

This invention relates to a kaleidoscopic or picture-viewing apparatus and consists in the provision of a film or paper carrier adapted for attachment to the end of a tube for viewing pictures applied to a film or a paper strip. The tube may either be fitted with a magnifying lens for enlarging the pictures or with mirrors for producing kaleidoscopic effects, the film carrier being for this purpose adapted for rotary adjustment on the tube.

Fig. 1 of the accompanying drawings represents a side view of the apparatus according to one construction, and Fig. 2 an end view of the same.

Fig. 3 is an end view of an apparatus of a modified construction, and

Fig. 4 an enlarged detail view of the same.

Fig. 5 shows a further modification of the film carrier, and

Fig. 6 shows a modified arrangement for feeding the film.

The device is composed of a film carrier comprising an elongated frame $d$ within which rolls $e$ are mounted for the reception of a film paper strip carrying transparent pictures. The frame is adapted for attachment to the end of a tube $a$ through which the pictures can be viewed. In the construction according to Fig. 2 the frame $d$ is for this purpose formed with a contracted middle portion, and the sides $d^1$ are curved in conformity with the tube so that they can grip the latter and hold the frame in position. The tube is formed with spaced beads $b$ and $c$ one of which engages slots in the members $d^1$ so as to prevent axial displacement of the film carrier relative to the tube while allowing rotary displacement of the same. The tube may be fitted with a magnifying lens, so that the pictures appear enlarged when viewed through the tube. The clip formed by the members $d^1$ is resilient so that different kinds of tubes can be used with the same film carrier and easily substituted for each other. Springs $f$ are arranged on the roller shafts between the actuating knob $e^1$ and the frame $d$ so as to brake the rollers and assist in keeping the film taut across the tube opening. The arrangement should be such that the film passes close to the end of the tube $a$ or to the frame members $d^1$. This excludes extraneous light and allows drawings to be made on a plain film or paper strip over the tube opening, so as to fit the latter, a thin plate of glass or the like being interposed as a support between the tube and the film. These drawings, when viewed through a kaleidoscopic tube, will appear as caricatures or other phantastic figures.

Fig. 3 shows a modification of the frame which is in this case formed with straight sides and composed of a strip whose ends are riveted together at $h$ midway between the ends of the frame. The rivet also holds a resilient ring $i$ whose ends $l$ are loose and passed crosswise through a slot $k$ in the opposite frame member. The ring is adapted to clamp itself to the tube $a$ between the beads $b$ and $c$ which serves as a guide allowing rotary but not axial relative displacement. The ends of the ring serve as finger pieces whereby the ring can be expanded to clear the bead $c$ when the film carrier is applied and removed. A spring $m$ may be connected across the two finger pieces $l$ so as to press on the latter and increase the clamping effect of the ring $i$.

In order to allow only short lengths of film or paper to be held in the carrier, the latter may be modified, as shown in Fig. 6, where pairs of rollers $o$, $o^1$ and $p$, $p^1$ are arranged so as to clamp the film or paper strip $n$ between them, the rollers being braked as previously described so as to hold the strip taut. The rollers may be clamped together by springs or made of or covered with rubber or the like. Fig. 5 shows an arrangement according to which the frame is adapted to hold two films at right angles, so that two pictures can be superposed across the tube opening.

I claim:

1. In combination: a kaleidoscopic tube having collars at the end counter to the ocular, and a film-carrying casing adapted to be attached to and detached from, said tube and to be turned thereon, and having slots engaged by said collars.

2. In combination: a kaleidoscopic tube having collars at the end counter to the ocular, and a film-carrying casing adapted to be attached to, and detached from, said tube and to be turned thereon, the sides of said frame being elastic and having slots engaged by said collars.

3. In combination: a kaleidoscopic tube, and a film-carrying casing adapted to be attached to, and detached from, said tube and to be turned thereon, and an elastic ring connected at its middle part with the said frame and having its ends project out of the frame on the other side thereof, said ring being adapted to prevent the film-carrying frame from being shifted axially upon said kaleidoscopic tube.

4. In combination: a kaleidoscopic tube, and a film-carrying casing adapted to, and detached from, said tube and to be turned thereon and an elastic ring connected at its middle part with the said frame and having its ends project out of the frame on the other side thereof, and a spring inserted between the projecting spring-ends and being so arranged as to tend to contract said elastic ring, this latter being adapted to prevent the film-carrying frame from being shifted axially upon the kaleidoscopic tube.

5. In combination: a kaleidoscopic tube, and a film-carrying casing adapted to be attached to, and detached from said tube and to be turned thereon, and an elastic ring connected at its middle part with the said frame and having its ends project out of the frame on the other side thereof and lying in one plane with the frame, the ring being adapted to prevent the film-carrying frame from being shifted axially upon the kaleidoscopic tube.

In testimony whereof I affix my signature.

ERNST PAUL BURKARD.